United States Patent
Seo

(10) Patent No.: US 6,353,463 B1
(45) Date of Patent: Mar. 5, 2002

(54) TV RECEIVER HAVING AN ANALOG/DIGITAL DUAL TUNER

(75) Inventor: Young-Joo Seo, Suwon (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/138,673

(22) Filed: Aug. 24, 1998

(30) Foreign Application Priority Data

Aug. 22, 1997 (KR) ............................................ 97-40211

(51) Int. Cl.[7] ................................................. H04N 5/50
(52) U.S. Cl. ......................... 348/731; 348/725; 348/678
(58) Field of Search ................................ 348/725, 726, 348/554, 678, 721, 705, 706, 558; 375/265, 321

(56) References Cited

U.S. PATENT DOCUMENTS

| | | | |
|---|---|---|---|
| 5,418,815 A | * 5/1995 | Ishikawa et al. | ............ 375/216 |
| 5,452,023 A | * 9/1995 | Kim | ............ 348/731 |
| 5,774,195 A | * 6/1998 | Miyahara et al. | ............ 348/726 |
| 6,148,185 A | * 11/2000 | Aschwanden | ............ 455/234.1 |
| 6,154,505 A | * 11/2000 | Konishi et al. | ............ 375/327 |

FOREIGN PATENT DOCUMENTS

| | | | |
|---|---|---|---|
| JP | 3-211979 | 9/1991 | ............ H04N/5/46 |
| JP | 8-181556 | 7/1996 | ............ H03G/3/20 |

\* cited by examiner

Primary Examiner—Victor R. Kostak
(74) Attorney, Agent, or Firm—Sughrue Mion, PLLC

(57) ABSTRACT

A TV receiver for receiving and signal-processing analog and digital broadcasting signals includes a dual tuner and control unit for automatically controlling RF gain of the dual tuner. A controller applies a channel select control signal according to each broadcasting viewing mode to the dual tuner and applies a AGC select signal of each broadcasting mode to a switch. The dual tuner selects a channel of a corresponding broadcasting mode among the received broadcasting signals according to the applied channel select control signal, controls the gain of the RF signal of the selected channel according to an applied automatic gain control signal, and converts the gain-controlled RF signal into an IF signal. A signal distributor identifies and outputs the IF signal output from the dual tuner according to the selected broadcasting mode (analog or digital). An analog processor restores an analog composite video signal from an analog IF signal. A digital processor restores a baseband digital video signal from a digital IF signal. Each of the analog and digital processors generates a respective automatic gain control signal ($AGC_a$ and $AGC_d$) according to the restored signal levels. The switch selects one of $AGC_a$ and $AGC_d$ to be supplied to the dual tuner. Accordingly, the TV receiver can be simply constructed to save on production costs, and provides for easy control of an analog/digital dual tuner using a channel select control signal and a AGC select signal according to each broadcasting mode.

4 Claims, 2 Drawing Sheets

TV RECEIVER HAVING AN ANALOG/DIGITAL DUAL TUNER

BACKGROUND OF THE INVENTION

1. Field of the Invention

The present invention relates to a TV receiver which receives both an analog broadcasting signal and a digital broadcasting signal and then processes the received analog and digital broadcasting signals. The present invention relates, more particularly, to a TV receiver having an analog/digital dual tuner and control unit for automatically controlling the radio frequency (RF) gain of the dual tuner.

2. Description of the Related Art

A general automatic gain control (AGC) circuit automatically controls the gain of an amplifier so that the level of an output signal is constant although the level of an input signal varies. The AGC circuit used in a TV receiver automatically controls an RF gain of the RF amplifier employed in a tuner and the intermediate frequency (IF) gain of an IF amplifier connected to an output end of the tuner, and thus maintains the level of a restored video signal to be constant although the level of a received broadcasting signal varies.

Meanwhile, an advanced TV receiver can receive and signal-process both an analog broadcasting signal in an analog broadcasting mode and a digital broadcasting signal in a digital broadcasting mode, and restores the received broadcasting signal into an original video signal to then be displayed on a screen.

Referring to FIG. 1, a conventional advanced TV receiver having an analog tuner and a digital tuner, where the RF gain of each is individually controlled, will be described.

The TV receiver of FIG. 1 includes a block for receiving and signal-processing a digital broadcasting signal to be restored into a baseband digital video signal, and a block for receiving and signal-processing an analog broadcasting signal to be restored into an analog composite video signal.

A digital tuner 10A receives a digital broadcasting signal and then selects a channel corresponding to a channel select control signal output from a controller 18. The tuner amplifies an RF signal of the selected channel according to a digital automatic gain control signal $AGC_d$ feedback from a digital automatic gain controller 14A, and converts the amplified RF signal into an IF signal. A digital IF processor 12A amplifies and detects the IF signal from the digital tuner 10A and restores the resultant signal into a baseband digital video signal. The digital automatic gain controller 14A generates a digital automatic gain control signal $AGC_d$ for lowering an amplification factor of a high-frequency amplifier (not shown) employed in the digital tuner 10A if the output level of the digital IF processor 12A is higher than a predetermined value. The controller 14A also generates a digital automatic gain control signal $AGC_d$ for increasing an amplification factor of the high-frequency amplifier (not shown) if the output level of the digital IF processor 12A is lower than a predetermined value. The generated digital automatic gain control signal is supplied to the digital tuner 10A.

Meanwhile, an analog tuner 10B receives a analog broadcasting signal, selects a channel corresponding to a channel select control signal output from the controller 18. It then amplifies an RF signal of the selected channel according to an analog automatic gain control signal $AGG_a$ feedback from an analog automatic gain controller 14B, and converts the amplified RF signal into an IF signal. An analog IF processor 12B amplifies and detects the IF signal from the analog tuner 10B and restores the resultant signal into an analog composite video signal. The analog automatic gain controller 14B generates an analog is automatic gain control signal $AGC_a$ for lowering an amplification factor of a high-frequency amplifier (not shown) employed in the analog tuner 10B if the output level of the analog IF processor 12B is higher than a predetermined value. Alternatively, the controller 14B generates an analog automatic gain control signal $AGC_a$ for increasing an amplification factor of the high-frequency amplifier (not shown) if the output level of the analog IF processor 12B is lower than the predetermined value. The generated analog automatic gain control signal is supplied to the analog tuner 10B.

A signal processor 15 converts a baseband digital video signal supplied from the digital IF processor 12A and an analog composite video signal supplied from the analog IF processor 12B into a luminance signal and a chrominance signal, respectively, and converts the luminance signal and the chrominance signal into a predetermined display format, to then be displayed on a CRT screen 16. Since the above signal processing method is well known to those skilled in the art, the detailed description thereof will be omitted.

The controller 18 applies a channel select control signal for selecting a corresponding channel to the digital tuner 10A if the channel selected by a user is a digital broadcasting mode, and applies a channel select control signal for selecting a corresponding channel to the analog tuner 10B if the channel selected by a user is an analog broadcasting mode. Accordingly, the digital tuner 10A or analog tuner 10B selects a corresponding channel according to the channel select control signal output from the controller 18.

As described above, since the conventional TV receiver shown in FIG. 1 includes the broadcasting signal processing blocks for respective broadcasting modes independently, there is no close operational relationship between the broadcasting signal processing blocks. The structure of the system is complicated and thereby contributes to production costs. Also, since the TV receiver of FIG. 1 controls the tuners 10A and 10B according to the broadcasting modes of the channels to be viewed, respectively, the control method is complicated and inefficient.

SUMMARY OF THE INVENTION

To solve the above problems, it is the object of the present invention to provide a TV receiver having a dual tuner capable of receiving and selecting an analog broadcasting signal or a digital broadcasting signal and a controller for automatically controlling the radio frequency (RF) gain of the dual tuner, in which the system is simplified and the structure is well organized.

To accomplish the above object of the present invention, there is provided a TV receiver for receiving and signal-processing an analog broadcasting signal and a digital broadcasting signal, the TV receiver has a dual tuner for selecting the channel of a corresponding broadcasting mode according to an applied channel select control signal, from among the received broadcasting signals. The dual tuner also controls the gain of a radio frequency (RF) signal of the selected channel according to an applied automatic gain control signal, and converts the gain-controlled RF signal into an intermediate frequency (IF) signal. The TV receiver also has a signal distributor for distributing the IF signal output from the dual tuner according to a broadcasting mode. It also includes an analog processor for amplifying and detecting the analog IF signal output from the signal distributor to be restored into an analog composite video signal and generating an analog automatic gain control signal for controlling the RF gain of the dual tuner in response to the level of the restored signal and a digital processor for amplifying and detecting the digital IF signal output from the signal distributor to be restored into a baseband digital video signal and generating a digital automatic gain control signal for controlling the RF gain of the dual tuner in response to the level of the restored signal. The TV receiver has a switching portion for selecting one of the automatic gain control signals, output from the respective processors, according to an applied AGC select signal and supplying the selected automatic gain control signal to the dual tuner. The TV receiver also has a controller for applying the channel select control signal of each broadcasting mode to the dual tuner and applying the AGC select signal of each broadcasting mode to the switching portion, in response to a user request.

DETAILED DESCRIPTION OF THE PREFERRED EMBODIMENT

Figure 2:
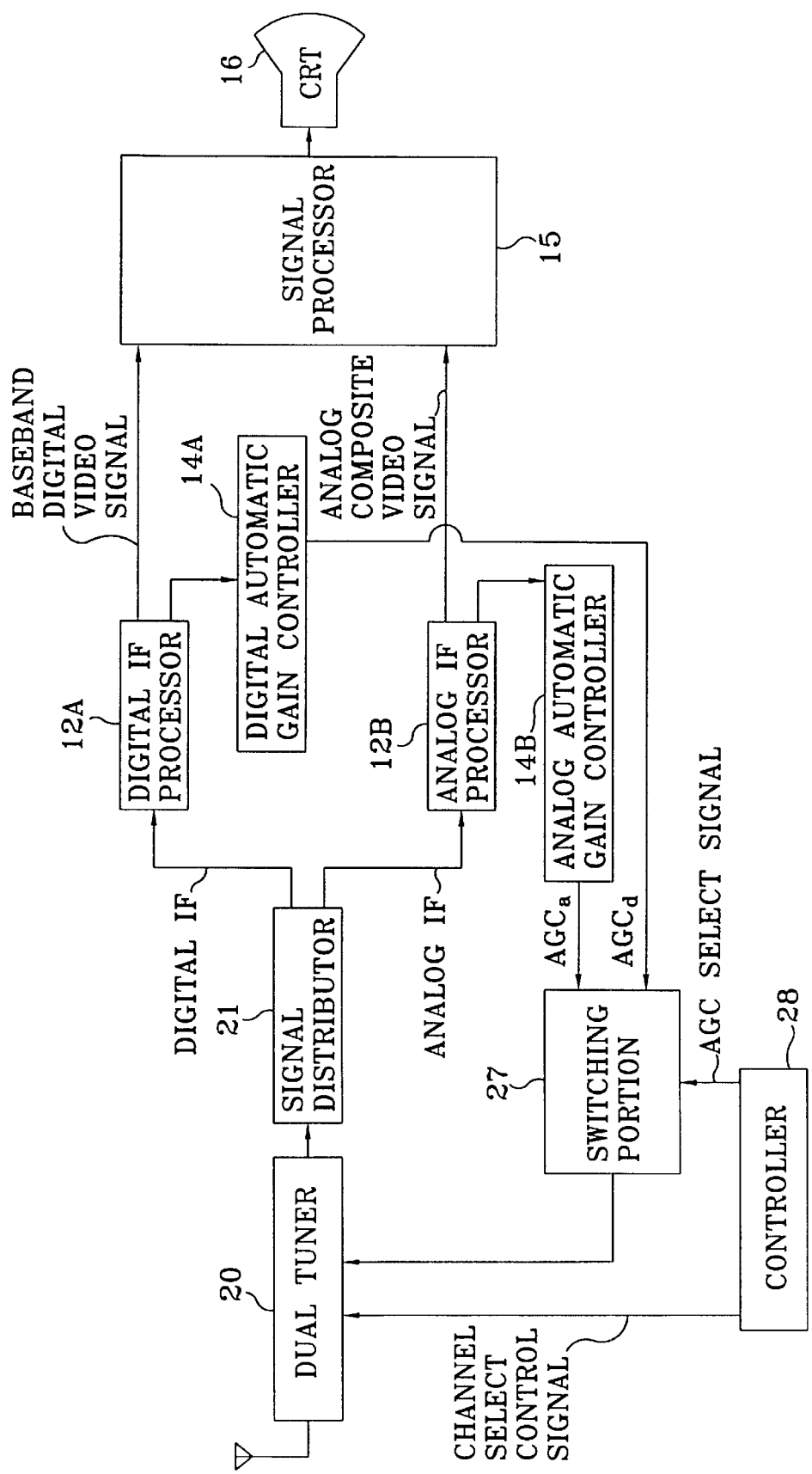
FIG. 2 is a block diagram showing a TV receiver having an analog/digital dual tuner and control unit for automatically controlling a RF gain of the dual tuner according to a preferred embodiment of the present invention.

A preferred embodiment of the present invention will be described with reference to FIG. 2. Referring to FIG. 2, a dual tuner 20 selects a channel of a corresponding broadcasting mode according to a channel select control signal supplied from a controller 28 among the received analog and digital broadcasting signals. Also, the dual tuner 20 controls the gain of a radio frequency (RF) signal of the selected channel according to an automatic gain control signal output from a switching portion 27, and then converts the gain-controlled RF signal into an intermediate frequency (IF) signal which can be easily amplified. A signal distributor 21 identifies the IF signal supplied from the dual tuner 20 according to a broadcasting mode, and then distributes the IF signal to a digital IF processor 12A if the IF signal is a digital IF signal, and to an analog IF processor 12B if the IF signal is an analog IF signal.

Figure 1:
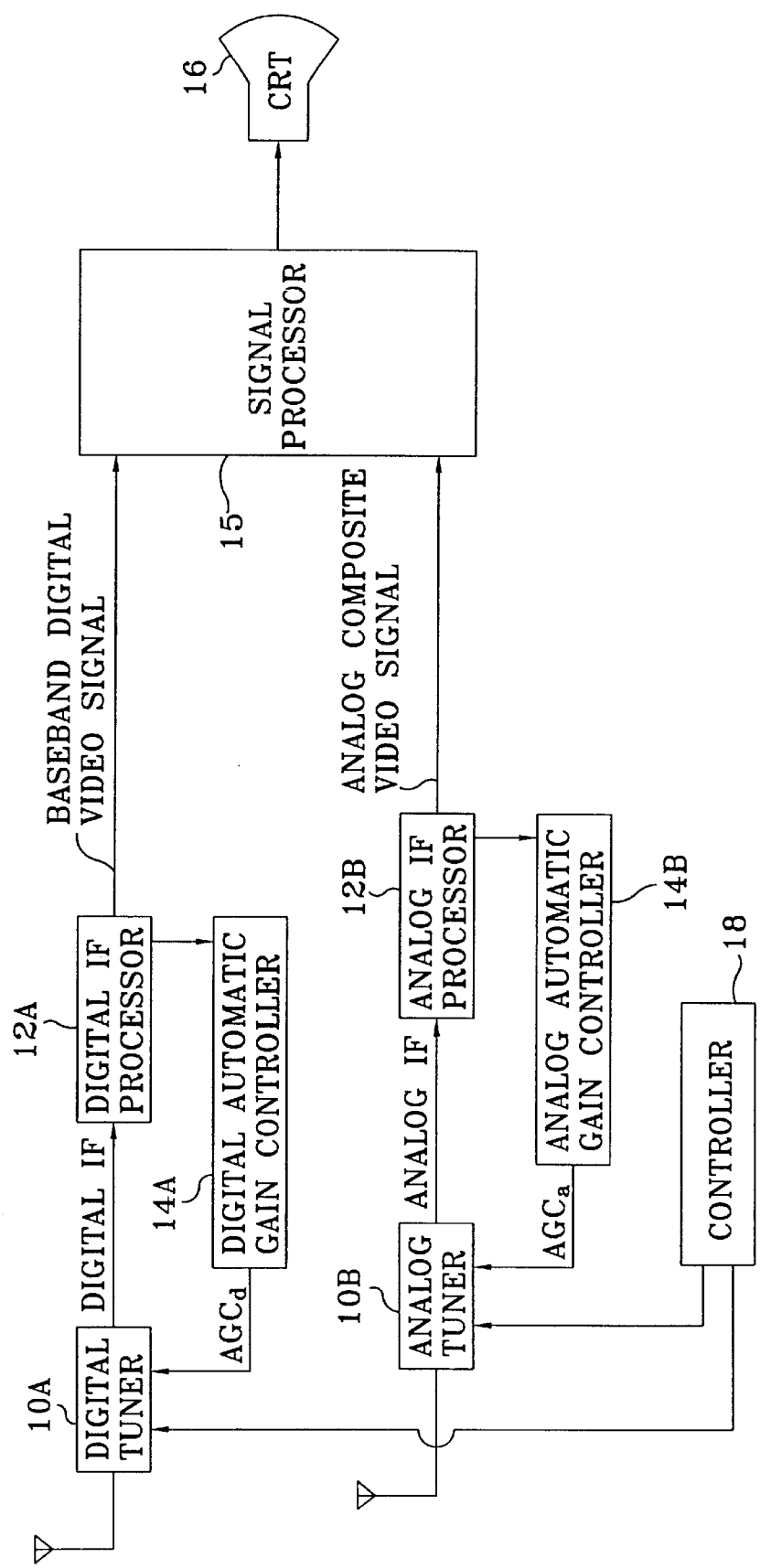
FIG. 1 is a block diagram showing a conventional, advanced TV receiver having an analog tuner and a digital tuner in which each of RF gains is controlled individually.

A digital IF processor 12A, a digital automatic gain controller 14A, an analog IF processor 12B, an analog automatic gain controller 14B, a signal processor 15 and a CRT 16 perform the same functions as those of the corresponding elements having the same reference numerals as those of FIG. 1, and the detailed description thereof will be omitted.

The switching portion 27 selects one of the digital automatic gain control signal output from the digital automatic gain controller 14A and the analog automatic gain control signal output from the analog automatic gain controller 14B according to a AGC select signal supplied from the controller 28, and supplies the selected automatic gain control signal to the dual tuner 20.

The controller 28 judges whether a channel selected by a user is a channel of an analog broadcasting mode and a digital broadcasting mode in response to a user request. The controller 28 applies the channel select control signal of each broadcasting mode to the dual tuner 20 on the basis of the judgement result and applies the AGC select signal of each broadcasting mode to the switching portion 27. Here, the controller 28 generates a AGC select signal for selecting an analog automatic gain control signal $AGG_a$ if the user selected channel is a channel of an analog broadcasting mode, and generates a AGC select signal for selecting a digital automatic gain control signal $AGC_d$ if the user selected channel is a channel of a digital broadcasting mode.

The operation of the FIG. 2 apparatus having the above-described structure will be described below. It is assumed that a user selects a particular channel of an analog broadcasting mode. The controller 28 applies a channel select control signal for selecting a particular channel of an analog broadcasting mode to the dual tuner 20 and applies a AGC select signal for selecting an analog automatic gain control signal $AGC_a$ to the switching portion 27, in response to a user request.

The dual tuner 20 selects a corresponding channel of an analog broadcasting mode according to an applied channel select control signal and converts the RF signal of the selected channel into an intermediate frequency (IF) signal. The signal distributor 21 distributes the analog IF signal supplied from the dual tuner 20 to the analog IF processor 12B. The analog IF processor 12B amplifies and detects the input analog IF signal and restores the resultant signal into an analog composite video signal. The analog automatic gain controller 14B generates an analog automatic gain control (AGC) voltage for lowering an RF gain of the dual tuner 20 if the signal level of the restored analog composite video signal is higher than a predetermined value, and generates an AGC voltage for increasing the RF gain of the dual tuner 20 if the signal level of the restored analog composite video signal is lower than the predetermined value. The switching portion 27 selects the AGC voltage supplied from the analog automatic gain controller 14B according to a AGC select signal supplied from the controller 28, and supplies the selected automatic gain control voltage to the dual tuner 20. The dual tuner 20 controls the gain of the RF signal of the selected channel according to the AGC voltage output from the switching portion 27 and converts the gain-controlled signal into an IF signal. The FIG. 2 apparatus repeatedly performs the above processes and maintains the level of the restored analog composite video signal to be constant although the level of the received RF signal varies.

In the case when a user selects a particular channel of a digital broadcasting mode, the operation of the FIG. 2 apparatus can be performed similarly to that of the analog broadcasting mode. Thus, the detailed description thereof will be omitted.

As described above, the TV receiver according to the present invention includes an analog/digital dual tuner, a signal distributor, a switching portion and a controller. Thus, a system for receiving and signal-processing an analog broadcasting signal and a digital broadcasting signal can be simplified and well-organized, and also reduces production costs. Also, the TV receiver according to the present invention controls a dual tuner 20 and a switching portion 27 using a channel select control signal and a AGC select signal both of which are related to the respective broadcasting mode of the channel to be viewed.

While only a certain embodiment of the invention has been specifically described herein, it will be apparent that numerous modifications may be made thereto without departing from the spirit and scope of the invention.

What is claimed is:

1. A TV receiver for receiving and signal-processing an analog broadcasting signal and a digital broadcasting signal, the TV receiver comprising:

a dual tuner, for selecting a channel of a corresponding broadcasting mode among the received broadcasting signals according to an applied channel select control signal, controlling the gain of a radio frequency (RF) signal of the selected channel according to an applied automatic gain control signal, and converting the gain-controlled RF signal into an intermediate frequency (IF) signal;

a signal distributor for distributing the IF signal output from the dual tuner according to the broadcasting mode;

an analog processor for amplifying and detecting the analog IF signal output from the signal distributor to be restored into an analog composite video signal, and generating an analog automatic gain control signal $AGC_a$ for controlling the RF gain of the dual tuner in response to the level of the restored signal;

a digital processor for amplifying and detecting the digital IF signal output from the signal distributor to be restored into a baseband digital video signal, and generating a digital automatic gain control signal $AGC_d$ for controlling the RF gain of the dual tuner in response to the level of the restored signal;

a switching portion for selecting one of the automatic gain control signals $AGC_a$ and $AGC_d$ output from the respective processors according to an applied AGC select signal, and supplying the selected automatic gain control signal to the dual tuner; and a controller for applying the channel select control signal of each broadcasting mode to the dual tuner and applying the AGC select signal of each broadcasting mode to the switching portion, in response to a user request.

2. The TV receiver according to claim 1, wherein said controller applies a AGC select signal for selecting the analog automatic gain control signal if a channel selected by a user is a channel of an analog broadcasting mode, and a AGC select signal for selecting the digital automatic gain control signal if a channel selected by a user is a channel of a digital broadcasting mode.

3. A TV receiver for receiving and signal-processing an analog broadcasting signal and a digital broadcasting signal, the TV receiver comprising:

a dual tuner, receiving an applied channel select control signal, so as to select a channel of broadcasting mode corresponding to the channel select control signal from among received broadcasting signals, wherein said dual tuner controls a radio frequency (RF) gain applied to an RF signal of the selected channel according to an applied automatic gain control (AGC) signal, and wherein the dual tuner converts the gain-controlled RF signal into an intermediate frequency (IF) signal;

a signal distributor which receives the IF signal of said dual tuner and distributes the IF signal according to the broadcasting mode;

an analog processor which receives an analog IF signal distributed by the signal distributor to be restored into an analog composite video signal, wherein the analog processor performs amplification and detection of the analog IF signal and generates an analog automatic gain control signal $AGC_a$ for controlling the RF gain of the dual tuner in response to the level of the restored analog composite video signal;

a digital processor which receives a digital IF signal distributed by the signal distributor to be restored into a baseband digital video signal, wherein the digital processor performs amplification and detection of the analog IF signal and generates a digital automatic gain control signal $AGC_d$ for controlling the RF gain of the dual tuner in response to the level of the restored baseband digital video signal;

a switch connected so as to select either $AGC_a$ or $AGC_d$, according to an applied AGC select signal, and supply the selected automatic gain control signal to the dual tuner; and a controller for, in response to a user request, applying the channel select control signal of each broadcasting mode to the dual tuner and applying the AGC select signal of each broadcasting mode to the switching portion.

4. The TV receiver according to claim 3, wherein said controller applies a AGC select signal for selecting $AGC_a$ if a channel selected by a user is a channel of an analog broadcasting mode, and applies a AGC select signal for selecting $AGC_d$ if a channel selected by a user is a channel of a digital broadcasting mode.

* * * * *